Jan. 30, 1934. S. A. STRICKLAND 1,945,094
TAPER ROLLER BEARING STRUCTURE
Filed Aug. 19, 1931 2 Sheets-Sheet 1
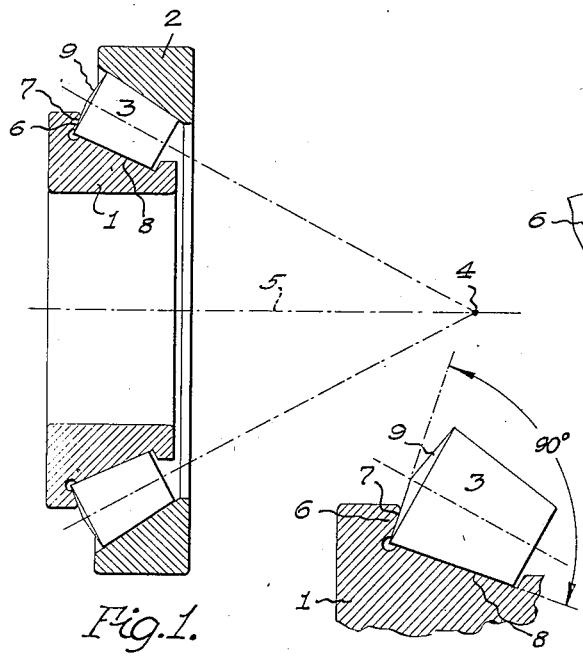
Fig.1.
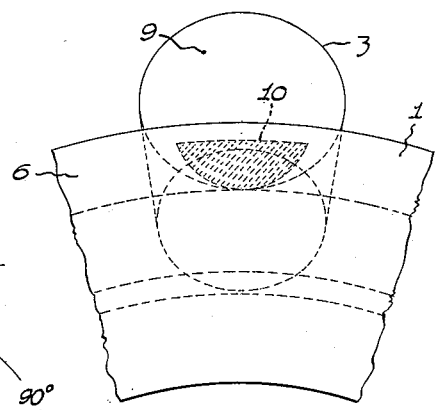
Fig.2a.
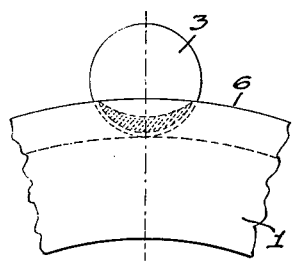
Fig.2.
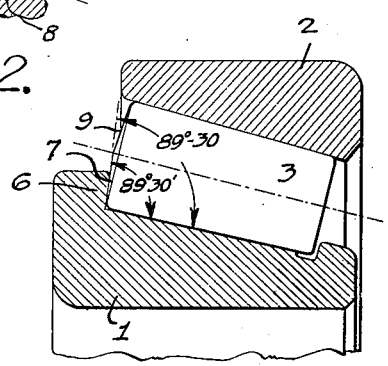
Fig.3.
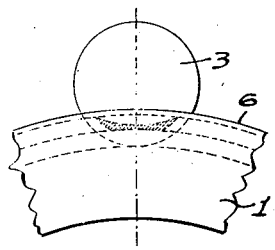
Fig.3a.
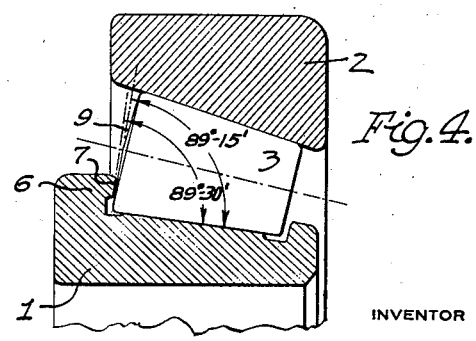
Fig.4.
Fig.4a.
INVENTOR
Silas A. Strickland,
BY
ATTORNEYS Jan. 30, 1934. S. A. STRICKLAND 1,945,094
TAPER ROLLER BEARING STRUCTURE
Filed Aug. 19, 1931 2 Sheets-Sheet 2

INVENTOR
Silas A. Strickland,
BY
ATTORNEYS

Patented Jan. 30, 1934

1,945,094

UNITED STATES PATENT OFFICE 1,945,094

TAPER ROLLER BEARING STRUCTURE

Silas A. Strickland, Detroit, Mich.

Application August 19, 1931. Serial No. 558,093

9 Claims. (Cl. 308—214)

This invention relates to improvements in taper roller bearing structures, and relates more particularly to structures of this type designed to produce predetermined contact characteristics between the thrust surfaces of the roll and cone member of the assembled bearing.

The present application is a continuation in part of my application filed March 24, 1928, Serial No. 264,532.

Taper roller bearing structures—which include the inner and outer cone members with the interposed rolls—generally have the inner cone member and the rolls presenting the desired dimensional and other characteristics of the bearing, the outer cone member generally being arranged complemental to the roll periphery and serving to apply the load to the rolls of the bearing. Consequently, in the present description, the cone member is considered as being the one which co-operates with the rolls in meeting the thrust conditions, the contact characteristics referred to being those which are set up in connection with the thrust feature.

Cone members for this purpose have a tapered seat on which the rolls are positioned—termed herein the roll seat—and an annular protecting flange having a plane face which extends at an angle to the roll seat, the flange being designed to resist the thrust pressures applied to the rolls by the load, the flange face opposing the roll end face for the purpose, the two faces thus being brought into contact conditions. The angle between the roll seat and the flange face is termed herein as the included angle of the cone member. The roll is tapered longitudinally, and the roll end face referred to extends at an angle to the peripheral face of the roll, the two faces thus providing an included angle condition between the faces. All bearings of this type have this general arrangement, and the explanation is made in order to make clear the meaning of several of the terms used in the description.

An ideal bearing of this type would present the flange face as spherical with respect to the center of the bearing, with the roll face as conoidal. But, for manufacturing reasons, the production of a bearing having this type of faces initially is impracticable, the cost, if possible of production, being prohibitive. Wear of the bearings, in service, however, tends to produce surfaces of this type, and if the life of the bearing can be maintained sufficiently long, the wear conditions would approximately produce such surfaces; generally, however, the life of the bearing members is not sufficient to permit the complete development of the surfaces under wear conditions, especially where the bearing is arranged to prevent rapid wear. Where rapid wear conditions are intended, the effect is to produce a corresponding advance of the roll toward the flange face, with the result that the bearing quickly becomes "loose" and requires complete adjustment, so that although the final result may be the approximately ideal operating faces, the necessity for taking up of wear as a preliminary to further operation presents a disadvantage. For this reason many users prefer a bearing in which the wear is at such a low rate that adjustment is generally not required within the life of the bearing itself.

Various forms of contact faces have been contemplated as a substitute for the ideal surfaces, faces which will permit of being readily produced and thus be suitable for manufacturing purposes. It has been found, however, that the most satisfactory surface is one that is a plane face. Consequently, most commercial bearings are formed with the flange face as a conical face, and with the roll end face as a flat or plane face, or a conical face. Faces of this character can be readily ground, with accuracy, and hence are especially adapted for manufacturing conditions where large capacity production conditions are an essential. The present invention relates to faces of this general character, and hence there is a definite included angle characteristic present in the bearings of the present invention.

One of the problems to be met in bearings of this type is that of "skewing" of rolls—the possibility of the roll becoming positioned slightly angular to its proper position. When this occurs the bearing is likely to become damaged if the condition is permitted to continue. Various expedients have been employed for the purpose of preventing or correcting this condition, the general method, however, being that of attempting to produce contact conditions on opposite sides of a plane connecting the axes of roll and cone member—considered as corresponding to a vertical radius of both roll and cone member—such contacts tending to prevent the skewing action of the roll on its seat, the roll constantly tending to right itself, and thus maintain its position.

One of the contemplated ways of producing this result is by forming the roll end face as a plane face, with the flange face parallel thereto on such plane—thus placing the included angles as substantially or actually the same. Since the roll face is a plane, the included angle is less than a right angle, and the angles of the faces thus are known as re-entrant angle faces. This arrangement generally provides a point of contact at each of the points of intersection of the peripheries of the active faces of the roll and flange, thus placing the contact points as spaced a maximum distance apart. This arrangement provides efficient prevention of the skewing effect, but has the disadvantage of permitting rapid wear development, especially during the earlier parts of the service, due to the small amount of initial contact. As the rate of wear varies with the amount of surface contact, decreasing as the surface contact increases, this use of the separated point contact must have a considerable wear characteristic before it reaches an area contact condition of material extent, and the wear therefore permits roll advance to an extent such as to produce the loose bearing effect.

Various ways have been contemplated to avoid these conditions, but these have been more or less unsatisfactory, since the solution of the difficulty involves questions relating to the character of initial contact conditions, and the question of securing specific types of contact are complicated by the conditions set up because of the use of conical faces. In all bearings of this type, the flange face is always a conical face, and where the roll end face is also conical, the conditions produced in attempting to set up opposing conical faces in the particular relation of a roll and cone member, so as to present an initial contact characteristic of a definite type, provide a number of difficulties.

Conical faces of this type have the inherent characteristic of being curved transversely of the face, viz; a plane which extends normal to a radius of the face will present the face line as being a curved line, the line being hyperbolic in type, in that the plane extends parallel to the axis of the member carrying the face, but having the distinction that the face being considered is at the end instead of the side of the cone itself. As a result, the characteristics of successive parallel planes develop in a different way.

A succession of profiles of such conical face taken on planes normal to a radius of the face, will present the characteristic that the profiles increase in flatness in the progression of profiles toward the periphery of the face; a characteristic present in both flange and roll end faces, where the roll face is conical. When the flange face and roll face are assembled, this increase in flatness is in opposite directions in the two opposing faces, the least flat profile of one face being opposite the flattest profile of the other face, the profiles within the overlapping zone of the roll and flange face being considered. Because of this condition it is impossible to produce a true mating relation of surfaces throughout the overlapping zone, and this has led to the attempt to produce the initial point contact conditions. But attempts to locate such points away from the points of intersection of peripheries above pointed out, is difficult, and especially difficult in order to provide exactness in point location. Unless exact in position, the wear on adjacent rolls may not be uniform, the result being that roll advance toward the flange face may differ, with the result that the load distribution on the rolls is materially disturbed.

The patent to Strickland and Zimmerman, No. 1,784,914, December 16, 1930, presents an arrangement by which the points are shifted from the points of intersection of the peripheries of roll and flange faces, the result being obtained by using dissimilar included angles in the roll and cone member, and forming an annular recess at the bottom of the flange face, so that the other portion of the roll face is opposite the recess on the vertical radius of the roll end within the overlapping zone. The arrangement is such that the periphery of such unopposed portion of the roll face can extend into the recess, the result being that the periphery of the active face of the roll end will set up contact with the flange face at the intersection of the roll face periphery with the inner periphery of the flange face instead of at the point of its intersection with the outer periphery of the flange face.

In my earlier application Serial No. 264,532, there is disclosed a substitute for the point contact arrangements referred to above as found in the earlier art. Instead of the contact being of the point type, the arrangement is designed to set up the conditions of an area contact of material size instead of a point. The area may cross the vertical radius of the roll face, but in any event it extends normal to such radius a distance sufficient to produce the resistance to skewing action that is desired, although the leverage present may not be as great as that provided by the points when the latter are spaced the maximum distance apart as referred to above. The result is obtained by having the opposing surfaces both conical and so arranged that the opposing face profiles of at least a portion of the overlapping zone will closely approach a mating relation for a considerable portion of the overlapping parts of the profiles. Exact mating initially is probably impossible, but the variations are so slight that when the assembled bearing is in position for service with the load applied, the load pressure will tend to set up a flow of metal sufficient to complete the desired contact; this result is especially present where the surfaces in opposition in a zone adjacent the periphery of the roll end, have the roll end profile a shade flatter than that of the opposing flange face profile, thus tending to prevent roll advance sufficient to bring the vertical radius portion into actual contact; the flow of metal will complete the area condition.

The advantage of a contact of this type is that it initially presents faces in contact over a considerable portion of the overlapping zone, thus presenting initially what can be secured by the point type only by extensive wear. Consequently, the rate of wear is exceedingly small, and if the life of the bearing is sufficient to permit completion of the wear to produce the "perfect surfaces", the amount of advance of the roll resulting from the wear, is so slight as to not materially affect the operation of the bearing.

In the prior application referred to the included angles are equal, and are indicated as substantially a right angle, the specific illustration being that of a right angle. Variations in this respect are possible, included angles of 89° 30' for instance, tending to increase the amount of the initial area, while angles slightly greater than a right angle will produce the area contact condition. The character of the area, however, will tend to vary with variations in some of the dimensions of the bearing. Changes in the angle of the roll seat of the cone member, or of the roll periphery, or both, as well as dimensions of the roll and cone member can affect the character of the area contact, since the characteristics of the conical faces are changed, and consequently it has been found advisable to produce this typical area contact characteristic under practically all sizes and dimensions of this general type of bearings, doing this by carrying the basic principles into the conditions of bearings in which the included angles of roll and cone member are dissimilar, the roll generally having its included angle less than that of the cone member, although this condition may be reversed in some cases.

The development into this field of dissimilar included angles presents problems of its own. For instance, with the included angle of the roll less than that of the cone member, the tendency is to produce the conditions of a single point contact— a contact at the periphery of the vertical radius of the roll end—thus eliminating the skew-preventing characteristic that the area contact is to provide. The general characteristics of conical faces remain, but the difference in included angles, tends to produce this result. Consequently, it becomes necessary to change this normal characteristic of dissimilar included angle conditions and produce the area contact characteristics while retaining the dissimilar included angle conditions.

The enlargement of the field of usefulness of this fundamental of an initial area characteristic so as to include bearing structures in which the included angles are dissimilar as well as to bearings of the Strickland and Zimmerman type referred to, constitutes the addition to the fundamental invention disclosed in my earlier application, the enlargement thus rendering this type of contact available for use with substantially all classes of bearings of this general type.

To these and other ends, therefore, the nature of which will be readily understood as the invention is hereinafter disclosed, said invention consists in the arrangement and combination of parts, hereinafter more fully described, illustrated in the accompanying drawings, and more particularly pointed out in the appended claims.

In the accompanying drawings, in which similar reference characters indicate similar parts in each of the views,—

Figure 1 is a vertical section of a bearing structure of this general type;

Fig. 2 is a fragmentary sectional view illustrating an arrangement wherein the included angles are equal and of substantially ninety degrees, Fig. 2a indicating somewhat diagrammatically a general type of area contact which can be produced where the dimensions are properly arranged;

Figs. 3 and 3a are respectively a fragmentary section and a diagrammatic indication of the character of area contact where the bearing structure has equal included angles of eighty-nine degrees, thirty minutes;

Figs. 4 and 4a are similar views showing the invention applied to a bearing of the Strickland and Zimmerman type of bearing;

Figure 5A:
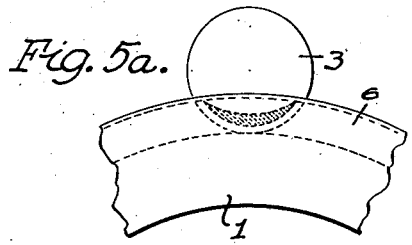
Figs. 5, 5a, 6 and 6a are companion views, similar to the above, but illustrating the invention applied to bearing structures in which the included angles are dissimilar.

The views presented are more or less illustrative and may be considered as more or less typical, variations in dimensions, cone or roll angles, etc., affecting the conditions and to some extent the character of contact. For instance, the contour line of Fig. 2a differs somewhat from that of the remaining disclosures, and being a possibility with certain dimensions; the form of a contact can be changed to the character shown in Fig. 3a while retaining the ninety degree included angles, where the dimensions and angles are suitable. It may be noted that in Figs. 2 and 2a the showing omits the usual rounding of peripheries, such rounding being shown in the succeeding figures.

In Fig. 1 is shown the general type of bearing referred to, 1 indicating the cone member, 2 the outer cone member, and 3 the roll. 5 indicates the axis of the cone member, with 4 indicated as the center of the bearing. 6 indicates the flange of the cone member and having the conical face 7, 8 indicating the roll seat, while 9 indicates the conical end of the roll. While the remaining views illustrate but portions of the bearing, the same reference characters are used, the additional parts of a bearing, such as cages, etc., being omitted for clearness.

Since bearings of this type have the roll end face in opposition to the flange face, the assembly obviously tends to set up a thrust relation between these faces, thus producing the conditions of a contact characteristic, the load weight on the bearing tending to constantly move the roller in the direction of the flange face, the latter resisting the advance. As wear takes place, the loss of metal permits this advance to take place, so that during service conditions there is always a contact characteristic present between the two faces. This contact characteristic will change under wear conditions, with the tendency to develop the conditions of a spherical surface for the flange face, and a curved radius of the roll end face within the area which overlaps that of the flange face in service, the roll and face in such area tending toward the completion of a partial conoidal face on the end of the roll. The character of the contact may determine whether or not the latter conditions will result within the life of the bearing. Some bearings are designed to produce rapid wear conditions in service to ensure the production of the spherical characteristic; in such case, the contact characteristic has been theoretically developed with a view to ensure the rapid wear conditions. Other bearings have been developed without regard to the character of the contact, the particular conditions of service being the basis of the production.

One condition which is present in bearings of this type, is the possibility of the roll "skewing" on its seat. This is not present with spherical surface bearings, but can be a result produced where the opposing thrust surfaces do not have the spherical characteristics. In the earlier days, the difficulty was overcome in part by the use of particular cage structures, but the later developments in bearing structure of this type have been to produce contact conditions such as to provide contact on opposite sides of the vertical radius of the roll, these contacts tending to retain the roll in proper alinement. This latter practice has tended to place the character of contact as of greater importance than in the earlier periods of the art, and has led to the development of particular characteristics to the opposing faces which are in thrust relation. Manufacturing conditions play an important part in the selection of such faces, so that the selection has been more or less along the lines of using faces which, initially, extend on straight lines on a radius of the face. On the flange face, such selection inevitably places the flange face as a conical face. With the roll end face, however, the condition may place the face as a flat or plane face, or it may be a conical face. And in either arrangement—both faces conical, or the roll end face a plane face—the relation between the flange face 7 and the roll seat 8 is an angular one, and can be considered as the included angle of the cone member, while the relation between the end face 9 of the roll and its periphery is also an angular one, and this can be considered as the included angle of the roll. The included angles may be equal or may be unequal, the equal included angle bearings presenting the opposing thrust faces as parallel on a plane of the bearing which connects the axes of roll and cone member, exact parallelism being absent when the structures have included angles that are unequal.

As heretofore pointed out, the invention is designed to provide the conditions of what may be termed an area contact characteristic, viz.; a contact characteristic where the contact is symmetrical with respect to the vertical radius and is on opposite sides of such radius; it may not, initially, extend across such radius—thus seeming to present the contact as large zones of area contact rather than a single zone, but, in the structure of the bearings, the faces are generally so close along such line, that when the load is applied to the bearing, the slight flow of metal present will tend to eliminate such space completely or to a great extent.

In Figs. 2 and 2a, which present the disclosure of my earlier application, the included angles are shown as equal and of substantially ninety degrees; as pointed out above, such arrangement, with certain dimensions and angles will produce the general contact characteristics shown at 10 in Fig. 2a; with other dimensions and angles, the contact characteristics will be more analagous to those indicated in Fig. 3a. Figs. 3 and 3a are likewise of the equal included angle type, the angle in these views being 89° 30'.

Figure 5:
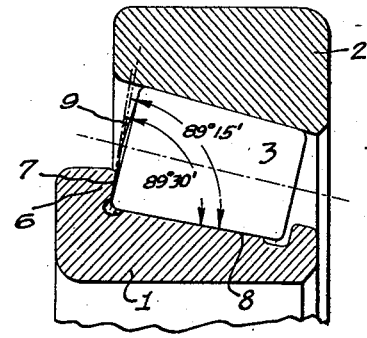
Figure 6A:
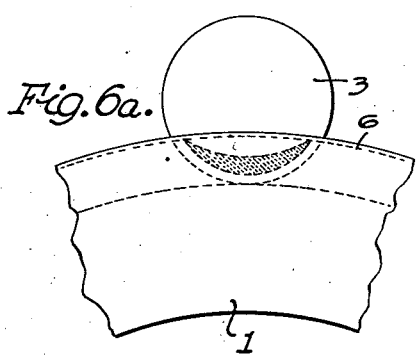
Figure 6:
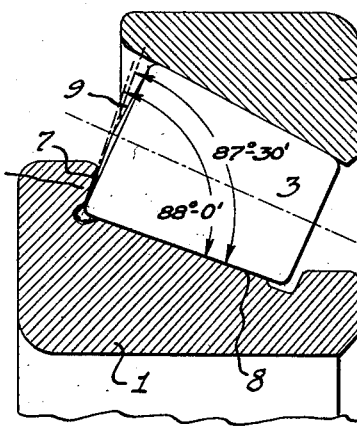

In Figs. 5 and 6, however, the included angles of cone member and roll differ, the showing of Fig. 4 also presenting this characteristic. The difference may and is generally small, but they do present the distinction that instead of the opposing faces being parallel on a section corresponding to a plane connecting the axes of the roll and cone member—as in Figs. 2 and 3—these faces vary from such parallelism. The normal effect of such a distinction is pointed out above.

The invention is designed to produce the conditions of a continuous area symmetrical to the vertical radius of the roll end. In some cases the width of the area along such line may be small, and in other cases of considerable width. But in each case the purpose is to have the outer contour line of the contact more or less symmetrical with that of the lower periphery of the overlapping zone—the periphery remote from the roll axis. For instance, if the flange face is continuous to its roll seat, the outer contour line of the contact would be symmetrical with the roll periphery (an arcuate form)—generally spaced therefrom because of the rounding of the peripheral edge of the roll, the usual arrangement to prevent roll chipping. If the flange face be of the type shown in the Strickland and Zimmerman patent referred to, the outer contour line will be affected by the fact that the flange face does not extend to the roll seat, and hence the arc characteristic referred to is changed by imposing upon it the line which represents the inner periphery of the flange face, no contact being present beyond such line (opposite the recess) for obvious reasons, although the roll end be the same in both cases; this difference, however, does not affect the general characteristic that the outer contour is symmetrical with the limit of the overlapping zone of the two faces remote from the roll axis, since the portion of the roll face that is opposite the recess of the flange face, is actually beyond the overlapping zone region. The two forms in this respect are illustrated, for instance, in Figs. 5, 6, and 4 the latter illustrating the arrangement where the flange face is of the type shown in the Strickland and Zimmerman patent. In each instance the contour extends from approximately the point of intersection of the peripheries of the active roll end and flange faces at one side of the vertical radius to the similar intersection at the other side of such radius, the contour line being substantially continuous between such points, and located below a line connecting such points of intersection.

The contact may be limited to such contour, in the form of a broadened line characteristic, in some instances, the area characteristic in such case being provided by the long contour line of material width, the form of the contact and its area being such as to extend the range of contact over a considerable portion of the overlapping areas, although the width of the contact, radially of the roll face, may be relatively small. Such initial contact causes the thrust to be distributed over an extended distance, thus tending to reduce wear effects and at the same time prevent development of skewing conditions. However, it is preferred to increase the width of the contact contour line radially of the roll and by bringing adjacent portions of the faces into initial contact, thus tending to have the contact area of extended width as well as extended length. In the illustrations of different contacts of the type, it will be seen that the tendency is to set up a contact of quarter-moon appearance, the showing in this respect being approximate only, since the various factors present will provide variations in the form and width. And while the drawings illustrate the contact band as continuous, for the purpose of illustration, the assembly of the bearing, in the absence of load, may not present this as completely continuous—although the outer contour will be substantially continuous—but in the presence of the load on the bearing, the flow of metal will produce the effect approximately as shown, the inner portion of the contact being more or less "blending" in type, this forming the zone where the surfaces are touching lightly, rather than the solid surface form of contact which is present at and toward the outer contour.

The conditions are due to the peculiarities present in the opposing faces, at least one of which is a conical face. The profiles of such faces are such that when opposing profiles are considered, the characteristics between them change constantly along the vertical radius, a condition which tends to cause the contact relationship of a single set of profiles to be affected to some extent by the adjacent profiles, with the result that a true mating relation in all profiles is more or less impossible where the opposing surfaces have the straight line characteristic radially. Because of these conditions, the opposing faces are brought into as close an approximation of the general form of contact desired, the variations from the mating relation in such area being so slight, that the flow of metal through the application of the load, will practically bring about the complete contact desired.

These results will depend upon the included angles employed. These vary in different bearing structures, dependent upon various factors. For instance, a change in the dimensions of cone member or roll will require a change in one or both faces, as will change in the angles of the roll axis and seat. Hence, each particular bearing is individual to itself with respect to the included angles, these being selected with a view to producing the general form of contact which forms the basis of the invention. The particular included angles can be selected in various ways, one way being that of a cut and try method which will produce efficient results and which is now described.

Figure 7A:
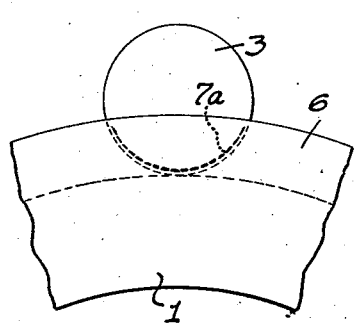
Figs. 7 and 7a are similar views showing the conditions present when the contact is in the form of the curvilinear contour lines.
Figure 7:
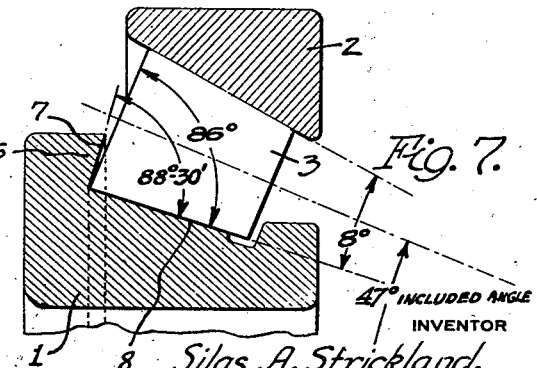

When the dimensions of cone member and roll have been determined, and the angle of the roll seat decided upon, a roll of the proper dimensions and taper angle is prepared, its end face being formed as a plane face. The cone member is then prepared with its roll seat and an initial flange face can be ground, if desired, on the basis of an included angle equal to the included angle of the roll, the depth of the face being such as to extend to the roll seat. An assembly of these will obviously present the contact as in the form of points located at the intersections of the active outer peripheries of roll and cone member. The flange face is then ground to increase the included angle of the cone member by a small increment—ten minutes, for instance—and the same roll is then applied and the contact noted; The initial points will have at least been changed to the beginning of a line leading along the periphery toward the vertical axis, the length of such line beginning depending upon the general factors of the bearing. Another increase of the included angle by a small increment is made and tested with the roll, this procedure continuing until the tests show the presence of a line of contact continuous from end to end, the line extending from the initial points and in the general form of an arc corresponding to the active periphery of the roll. When this latter condition is reached in the tests, the included angle of the cone member for the bearing has been determined. Figs. 7 and 7a indicate the contact at such time, the contour line being indicated at 7a.

To ascertain the included angle of the roll that is to be used with this cone member, a duplicate roll with the included angle increased by a small increment—ten minutes, for example—is substituted in the test; if the line contact remains intact, another duplicate roll with its included angle increased by a small increment is substituted in the test, and the effect noted. As will be understood, each added increment has correspondingly increased the depth of the material added to the initial plane face and increased the conical angle, thus tending to bring the roll face portion inside of the contact line in closer proximity to the opposing portions of the flange face. A continuation of this practice of introducing rolls of increasing increment in the included angle will result in the condition that these inner portions will reach the condition of contact, and when this contact prevents advance of the roll sufficient to present the contour line contact as continuous, it will be understood that the increment addition has become too great, and the previous roll of the series becomes the roll of the bearing, unless it should be desired to secure closer approximation, in which case a roll with a smaller increment added is tested, the arrangement continuing if desired until the roll maximum included angle is obtained with extreme accuracy. This is not actually essential, however, where the stage development has been by small increments.

With the cone member and the desired number of rolls of the bearing assembled, and placed under load conditions, it will be found that the resultant contact will have the general characteristics which underlie the present invention. In some cases, the included angles of cone member and roll will be equal thus producing the form of bearing presented in the said Strickland application. In most instances, however, the included angles will be unequal. A few instances of these are shown in the drawings. For instance, in Fig. 6, the included angle of the cone member is 88°, while that of the roll is 87° 30'; the character of the contact is approximately that illustrated in Fig. 6a. In Fig. 5, the cone member included angle is 89° 30', while that of the roll is 89° 15'; the contact is approximately that shown in Fig. 5a. In Fig. 3, the included angles of cone member and roll are equal (89° 30'), the character of the contact being shown in Fig. 3a, this equality in angle illustrating conditions such as presented in the earlier application.

In Fig. 4, the included angles of Fig. 5, are utilized in connection with the type of cone member shown in the Strickland and Zimmerman patent referred to, Fig. 4a illustrating the character of contact. A comparison of the contacts will show that the contact of Fig. 4 has its inner bounds slightly closer to the roll center, this being due to the fact that the recess of the cone member has permitted the roll to advance slightly farther than in Fig. 5, the result being that the section of the contour line determined by the inner periphery of the flange face has been made definitely continuous and connects the arcuate portions which had previously been provided by the roll periphery. In other words, with the included angles determined as above and producing the contact of Fig. 5, the addition of the recess to the cone member, eliminates the portion of the contact below the inner periphery of the flange face, the slight advance of the roll increasing the contact in the direction of the center of the roll, as shown.

As indicated in Figs. 7 and 7a, the contour line has the general characteristics of each of the forms which do not include the undercut recess, this being the basic characteristic of these forms. In these views, the roll end is a plane or flat surface, the flange face having the non-parallel characteristic pointed out above. It is possible, of course, to employ the bearing with the contact such as shown in these views, and thus obtain the basic characteristic of the contact since it includes an extended area of the overlapping zone and it is the purpose to include such line contact within the scope of the present invention. Such form is subject to more rapid wear than where the area is increased in width by changing the roll end to a conical face as pointed out above, but the arrangement provides an efficient bearing. It is preferred, however, to provide the maximum contact relation possible in following the method of development of the faces described above, thus reducing the rate of wear of the bearing and providing for efficient service. It is possible, however, that under certain dimensional conditions and angles, the additions to the roll end would be so slight, in preserving the continuous line characteristic, that, for manufacturing purposes, the slight addition may be omitted, and the roll end remain a plane surface; under such conditions, the wear will bring the increased width into activity without such an advance of the roll as will require early adjustment of the bearing. This latter will be readily apparent from the fact that in the assembly, the application of the load will tend to increase this area contact characteristic by increasing the width of the contour line.

In each case, therefore, it will be seen that the outer contour of the area—the contour remote from the roll axis—is generally symmetrical to a vertical radius and also with the lower periphery of the overlapping zone of the active surfaces of the flange and roll end faces, and is preferably substantially continuous from end to end. The active faces may not include the radial length of the flange or the roll end—as where the outer periphery of these are rounded, or the relative included angles and dimensions are such as to produce the contour line condition of Fig. 2a—but in each instance, the ends of the contour line approach the points of intersection of the active outer peripheries of the flange and roll face in producing the overlapping zone, and the continuity of the contour line is below a line which connects such points of intersection.

While I have herein shown and described various ways in which the invention may be carried into effect, without, however, attempting to disclose all the variations therefrom which may result from the many varied conditions which may be produced by variations in dimensions, angles, etc., it is to be understood that I reserve the right to make any and all such changes and modifications therein as may be found essential and desirable in meeting the exigencies of manufacturing and service conditions, insofar as the same may fall within the spirit and scope of the invention as expressed in the accompanying claims, when broadly construed.

Having thus described said invention, what is claimed as new is:

1. A taper roller bearing provided with concentric conical faces co-operative with tapered rolls therebetween to produce a resultant endwise thrust of the rolls when assembled for service and having a shoulder positioned to receive and resist such thrust, said shoulder having a conical thrust face co-operative with the opposing thrust face of a roll to produce a contact relation therebetween of such thrust faces within an overlapping area of such opposing thrust faces, with the resultant contact including approximately an extended portion of the boundary of the overlapping area remote from the roll axis.

2. A bearing as in claim 1 characterized in that the conical face of the shoulder is formed with an inner periphery serving to define a portion of such boundary of the overlapping area and is co-operative in presenting a portion of such extended contact.

3. A bearing as in claim 1 characterized in that the overlapping area is symmetrical to a line connecting the axis of the roll with the axis of the bearing, the extended contact being symmetrically disposed relative to such line.

4. A bearing as in claim 1 characterized in that the thrust face of the roll also is conical and active to provide additional contact within the overlapping area in the direction of the roll axis.

5. A bearing as in claim 1 characterized in that the thrust face of the roll also is conical, the included angles of the roll and the shoulder-carried element being substantially equal.

6. A bearing as in claim 1 characterized in that the thrust face of the roll also is conical, the included angle of the roll differing from that of the shoulder-carried element.

7. A bearing as in claim 1 characterized in that the thrust face of the roll also is conical, the included angle of the shoulder-carried element being greater than that of the roll.

8. A bearing as in claim 1 characterized in that the extended contact boundary portion is defined by a substantially continuous curvilinear line.

9. A bearing as in claim 1 characterized in that the extended contact boundary portion is defined by a substantially continuous curvilinear line having a length to at least approach the outwardly defining line of the contact face of the shoulder.

SILAS A. STRICKLAND.